(12) United States Patent
Kubo

(10) Patent No.: US 10,917,531 B2
(45) Date of Patent: *Feb. 9, 2021

(54) OPERATION APPARATUS, INFORMATION PROCESSING SYSTEM, AND OPERATION METHOD FOR OUTPUTTING A MESSAGE BY VOICE SOUND

(71) Applicant: Ricoh Company, Ltd., Tokyo (JP)

(72) Inventor: Shuko Kubo, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 24 days.

This patent is subject to a terminal disclaimer.

(21) Appl. No.: 16/391,739

(22) Filed: Apr. 23, 2019

(65) Prior Publication Data

US 2019/0253572 A1    Aug. 15, 2019

Related U.S. Application Data

(63) Continuation of application No. 15/689,354, filed on Aug. 29, 2017, now Pat. No. 10,320,996.

(30) Foreign Application Priority Data

Oct. 18, 2016    (JP) ................. 2016-204737

(51) Int. Cl.
```
G06F 3/12      (2006.01)
H04N 1/00      (2006.01)
G03G 15/00     (2006.01)
G10L 15/26     (2006.01)
```
(Continued)

(52) U.S. Cl.
CPC ..... H04N 1/00384 (2013.01); G03G 15/5004 (2013.01); G03G 15/5016 (2013.01); G10L 15/26 (2013.01); H04N 1/00278 (2013.01);
*H04N 1/00405* (2013.01); *G03G 2215/00126* (2013.01); *G06F 3/1229* (2013.01);
(Continued)

(58) Field of Classification Search
CPC ........... H04N 1/00384; H04N 1/00278; H04N 1/00405; H04N 1/32582; H04N 2201/0094; G06G 15/5004; G06G 15/5016; G10L 13/00; G10L 15/26; G03G 2215/00126; G06F 3/1229
USPC ......................................... 358/1.1–1.18, 402
See application file for complete search history.

(56) References Cited

U.S. PATENT DOCUMENTS 7,318,198 B2    1/2008   Sakayori et al.
8,294,929 B2   10/2012   Kuwano
(Continued)

FOREIGN PATENT DOCUMENTS

JP         2003-323081         11/2003

*Primary Examiner* — Gabriel I Garcia
(74) *Attorney, Agent, or Firm* — IPUSA, PLLC

(57) ABSTRACT

An operation apparatus operates an electronic device. The operation apparatus includes a receiver configured to receive a first image from the electronic device; an image generator configured to generate a second image including the first image received by the receiver; a message setter configured to set a message corresponding to a status of the electronic device, with respect to the first image included in the second image; a display configured to display the second image; and a voice sound outputter configured to output, by voice sound, the message set with respect to the first image, in response to a user operating the first image included in the second image being displayed.

20 Claims, 13 Drawing Sheets

(51) Int. Cl.
*G10L 13/00* (2006.01)
*H04N 1/32* (2006.01)

(52) U.S. Cl.
CPC .......... *G10L 13/00* (2013.01); *H04N 1/32582* (2013.01); *H04N 2201/0094* (2013.01)

(56) References Cited

U.S. PATENT DOCUMENTS

| | | | |
|---|---|---|---|
| 2003/0020760 A1* | 1/2003 | Takatsu | H04N 1/00408 |
| | | | 715/810 |
| 2008/0212145 A1 | 9/2008 | Kim et al. | |
| 2011/0178804 A1* | 7/2011 | Inoue | G10L 15/26 |
| | | | 704/275 |
| 2011/0228304 A1 | 9/2011 | Kuwano | |

* cited by examiner

FIG.8

| IMAGE ELEMENT ID | IMAGE ELEMENT | MESSAGE |
|---|---|---|
| C1 | COPY BUTTON | COPY APPLICATION WILL BE ACTIVATED. |
| C2 | START BUTTON | PROCESS WILL START. |
| C3 | END BUTTON | PROCESS WILL END. |
| ... | ... | ... |

FIG.9

| STATUS ID | STATUS | MESSAGE |
|---|---|---|
| S1 | ERROR 1 | AN ERROR 1 HAS OCCURRED. PLEASE CONTACT THE ADMINISTRATOR. |
| S2 | ERROR 2 | AN ERROR 2 HAS OCCURRED. |
| S3 | SYSTEM SETTING APPLICATION IS BEING ACTIVATED | A FUNCTION THAT IS NOT SUPPORTED HAS BEEN ACTIVATED. PLEASE TAP THE HOME BUTTON AND RETURN TO THE HOME SCREEN. |
| ... | ... | ... |

FIG.10

| IMAGE ELEMENT ID | IMAGE ELEMENT | ARRANGEMENT INFORMATION | MESSAGE |
|---|---|---|---|
| C2 | HOME BUTTON | ARRANGEMENT C2 | HOME APPLICATION WILL BE ACTIVATED. |
| C3 | END BUTTON | ARRANGEMENT C3 | PROCESS WILL END. |
| Im1 | MFP IMAGE | ARRANGEMENT Im1 | A FUNCTION THAT IS NOT SUPPORTED HAS BEEN ACTIVATED. PLEASE TAP THE HOME BUTTON TO RETURN TO THE HOME SCREEN. |
| ... | ... | ... | ... |

OPERATION APPARATUS, INFORMATION PROCESSING SYSTEM, AND OPERATION METHOD FOR OUTPUTTING A MESSAGE BY VOICE SOUND

CROSS-REFERENCE TO RELATED APPLICATION

The present application is a continuation application of U.S. patent application Ser. No. 15/689,354, and claims priority to Japanese Patent Application No. 2016-204737, filed on Oct. 18, 2016, the contents of which are incorporated herein by reference in their entirety.

BACKGROUND OF THE INVENTION

1. Field of the Invention

The present invention relates to an operation apparatus, an information processing system, and an operation method.

2. Description of the Related Art

In the related art, an operation apparatus, in which an Operating System (OS) such as Android (registered trademark) is installed, is used as an operation panel for operating an image forming apparatus. This operation apparatus is capable of reading aloud a message according to a user interface (UI) part, such as an operation button in the screen operated by a user, by using a reading aloud function (talk back function) provided in Android, etc. Accordingly, the operation apparatus is capable of reading aloud, to the user, the content of the UI part in the screen operated by the user. By using such an operation apparatus, even a visually impaired person can operate the image forming apparatus.

FIG. 1 illustrates an example of an operation screen of a copy application displayed on an operation apparatus of the related art. The operation screen illustrated in FIG. 1 includes UI parts such as operation buttons for setting the color mode, the print sheet type, and the number of copies to be printed, and a start button for starting a copy operation. These UI parts are generated by the operation apparatus, and therefore when a visually impaired person uses the operation apparatus, the operation apparatus can recognize the UI part operated by the user, and read aloud a message set for the UI part. For example, when the start button is operated, the operation apparatus reads aloud a message saying "copying will start". In the operation screen of FIG. 1, the UI parts are large and are arranged in a simple manner, such that a visually impaired person can easily use the UI parts.

On the other hand, an image forming apparatus of the related art that does not have the above operation apparatus, displays an image of an operation screen generated by the image forming apparatus, on the operation screen of the operation panel. For a physically unimpaired person, who is used to using such an operation screen of the related art, it may be easier to use an operation screen displayed by an image forming apparatus of the related art, rather than the operation screen as illustrated in FIG. 1. In consideration of the convenience of such a user who is physically unimpaired, in recent years, there are operation apparatuses that are configured to receive an image of an operation screen of the related art generated by the image forming apparatus, and display the received image.

Patent Document 1: Japanese Unexamined Patent Application Publication No. 2003-323081

SUMMARY OF THE INVENTION

An aspect of the present invention provides an operation apparatus, an information processing system, and an operation method in which one or more of the disadvantages of the related art are reduced.

According to one aspect of the present invention, there is provided an operation apparatus for operating an electronic device, the operation apparatus including a receiver configured to receive a first image from the electronic device; an image generator configured to generate a second image including the first image received by the receiver; a message setter configured to set a message corresponding to a status of the electronic device, with respect to the first image included in the second image; a display configured to display the second image; and a voice sound outputter configured to output, by voice sound, the message set with respect to the first image, in response to a user operating the first image included in the second image being displayed.

BRIEF DESCRIPTION OF THE DRAWINGS

FIG. 8 illustrates an example of a first message table according to the first embodiment of the present invention;

FIG. 9 illustrates an example of a second message table according to the first embodiment of the present invention;

FIG. 10 illustrates an example of a message setting table according to the first embodiment of the present invention;

DETAILED DESCRIPTION OF THE PREFERRED EMBODIMENTS

Figure 1:
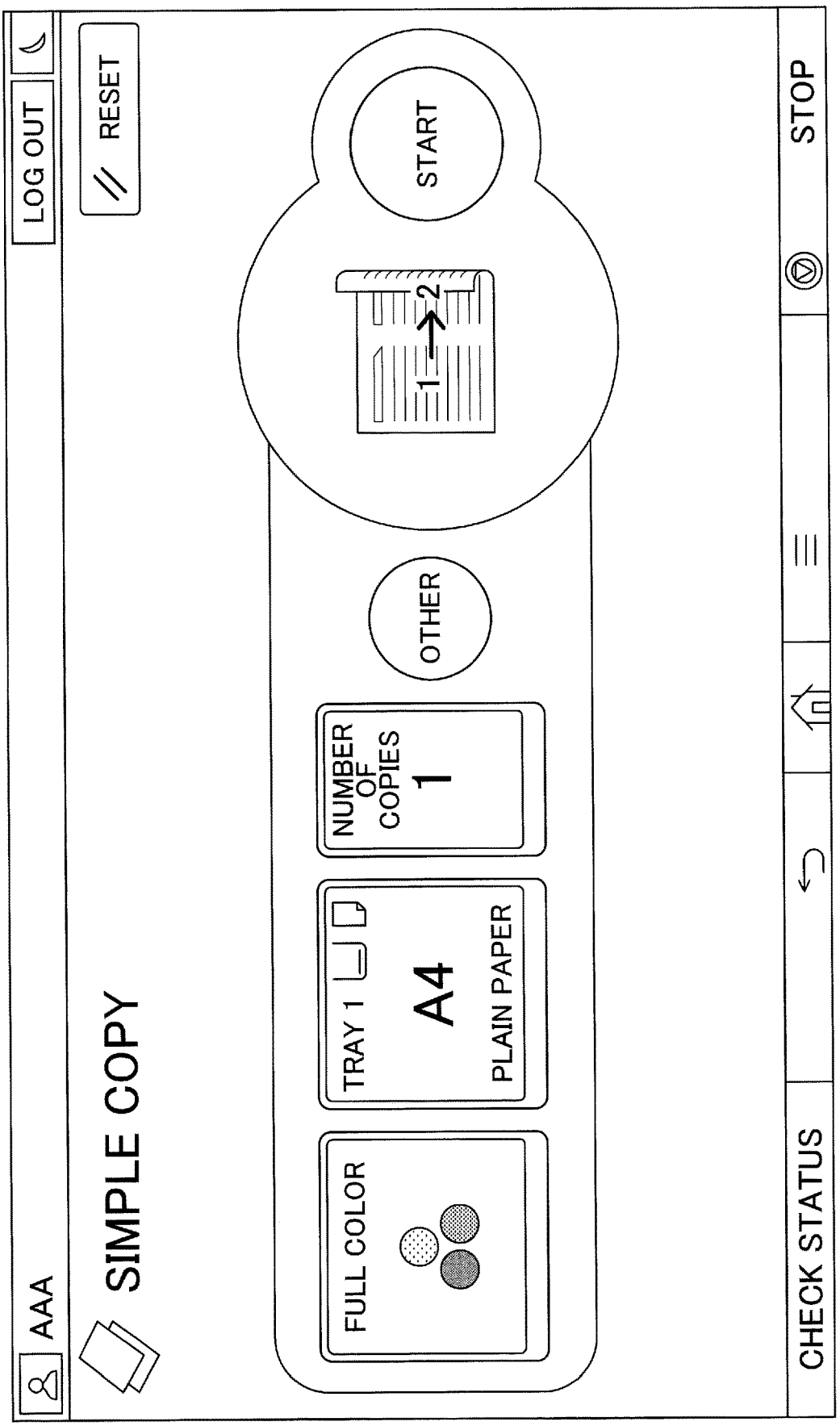
FIG. 1 illustrates an example of an operation screen of a copy application displayed on an operation apparatus of the related art.

When the operation apparatus of the related art displays an image of an operation screen that is received from the image forming apparatus, there has been a problem because the operation apparatus is unable to recognize the UI parts included in this image, and is thus unable to read aloud a message according to a UI part. As a result, when the operation apparatus of the related art displays an image received from the image forming apparatus, even when a UI part included in the image is operated, the operation apparatus is unable to output a message by voice sound. Therefore, it has been difficult for a visually impaired person to use the operation apparatus of the related art.

A problem to be solved by an embodiment of the present invention is to provide an operation apparatus that includes an operation panel configured to display an image received from an electronic device, and that is capable of reading aloud a message when the image received from the electronic device is operated.

Embodiments of the present invention will be described by referring to the accompanying drawings. In the specification and drawings of the embodiments, the elements having substantially the same functions are denoted by the same reference numerals, and overlapping descriptions are omitted.

First Embodiment

A description is given of an electronic device system according to a first embodiment by referring to FIGS. 2 through 11. The electronic device system according to the present embodiment includes an electronic device and an operation apparatus used by a user for operating the electronic device. The electronic device may be, for example, a facsimile machine, a printer, a scanner, a copier, a multi-function peripheral (MFP), a refrigerator, a washing machine, a television set, a microwave oven, and a vacuum cleaner, etc., however, the electronic device is not limited as such. In the following, a description is given of an example in which the electronic device is an MFP.

Figure 2:
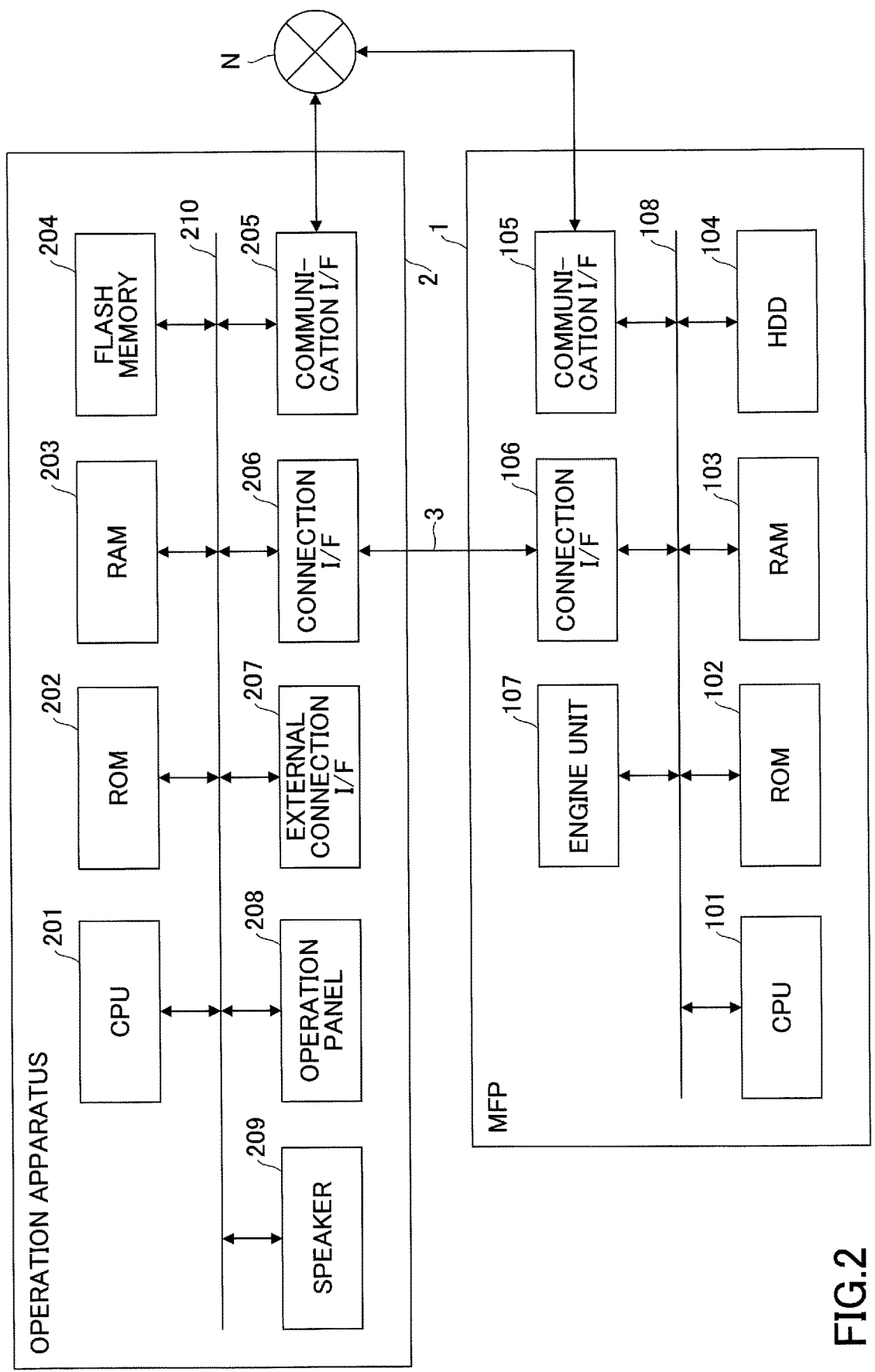
FIG. 2 is a hardware block diagram of the electronic device system according to a first embodiment of the present invention.

First, a description is given of a hardware configuration of the electronic device according to the present embodiment. FIG. 2 is a hardware block diagram of the electronic device system according to the present embodiment. The electronic device system of FIG. 2 includes an MFP (electronic device) 1, an operation apparatus 2, and a communication path 3.

The MFP 1 includes a facsimile function, a printer function, a scanner function, and a copy function, etc., and the MFP 1 operates according to instructions received from the operation apparatus 2. The MFP 1 includes a Central Processing Unit (CPU) 101, a Read Only Memory (ROM) 102, a Random Access Memory (RAM) 103, and a Hard Disk Drive (HDD) 104. Furthermore, the MFP 1 includes a communication interface (I/F) 105, a connection I/F 106, an engine unit 107, and a bus 108.

The CPU 101 executes programs stored in the ROM 102 and the HDD 104, to control the overall operations of the MFP 1 and implement various functions of the MFP 1.

The ROM 102 stores various programs and data. The RAM 103 provides a work space for the CPU 101. The HDD 104 stores various programs and data.

The communication I/F 105 is an interface for connecting to a network N and communicating with an external apparatus. Examples of the network N are a Local Area Network (LAN), a Wide Area Network (WAN), and the Internet, etc. Examples of the external apparatus are another MFP, a server computer, and a client computer, etc.

The connection I/F 106 is an interface for connecting to the communication path 3 and communicating with the operation apparatus 2.

The engine unit 107 is one or more devices for implementing a facsimile function, a printer function, a scanner function, and a copy function, etc. The engine unit 107 includes, for example, an image reading unit (scanner) for reading an image of an original document, an image forming unit (plotter) for printing an image on a print medium, and a fax unit for performing fax communication, etc. Furthermore, the engine unit 107 may include a sorting part (finisher) for sorting the print media on which images have been printed, and an Auto Document Feeder (ADF) for automatically feeding the print medium, etc.

The bus 108 interconnects the CPU 101, the ROM 102, the RAM 103, the HDD 104, the communication I/F 105, the connection I/F 106, and the engine unit 107.

The operation apparatus 2 accepts information and instructions according to an operation from the user, and sends the accepted information and instructions to the MFP 1. The operation apparatus 2 includes a CPU 201, a ROM 202, a RAM 203, a flash memory 204, a communication I/F 205, a connection I/F 206, an external connection I/F 207, an operation panel 208, a speaker 209, and a bus 210.

The CPU 201 executes programs stored in the ROM 202 and the flash memory 204, to control the overall operations of the operation apparatus 2 and implement various functions of the operation apparatus 2.

The ROM 202 stores various programs and data. The RAM 203 provides a work space for the CPU 201. The flash memory 204 stores various programs and data.

The communication I/F 205 is an interface for connecting to a network N and communicating with an external apparatus. Examples of the network N are a LAN, a WAN, and the Internet, etc. Examples of the external apparatus are another MFP, a server computer, and a client computer, etc.

The connection I/F 206 is an interface for connecting to the communication path 3 and communicating with the MFP 1.

The external connection I/F 207 is an interface for communicatively connecting with an external device. Examples of an external device are an Integrated Circuit (IC) card reader, a microphone, and a keyboard, etc.

The operation panel 208 includes display such as an Liquid Crystal Display (LCD) and an organic Electro Luminescence (EL) display, and a touch panel provided on the display, etc. The operation panel 208 accepts information and instructions according to an operation from the user. Furthermore, the operation panel 208 displays various types of information, such as information according to the accepted operation, the operation status and the setting status of the MFP 1, etc. The operation panel 208 may include an operation unit such as hardware keys and a display unit such as a lamp.

The speaker 209 outputs a message described later by voice sound. The speaker 209 may be connected to the MFP 1 via the external connection I/F 207.

The bus 210 interconnects the CPU 201, the ROM 202, the RAM 203, the flash memory 204, the communication I/F 205, the connection I/F 206, the external connection I/F 207, the operation panel 208, and the speaker 209.

The communication path 3 communicatively connects the MFP 1 and the operation apparatus 2. The communication standard of the communication path 3 may be any standard, for example, a wired communication standard such as a Universal Serial Bus (USB) and a wireless communication standard such as Wi-Fi. Furthermore, power may be supplied from the MFP 1 to the operation apparatus 2, via the communication path 3.

Figure 3:
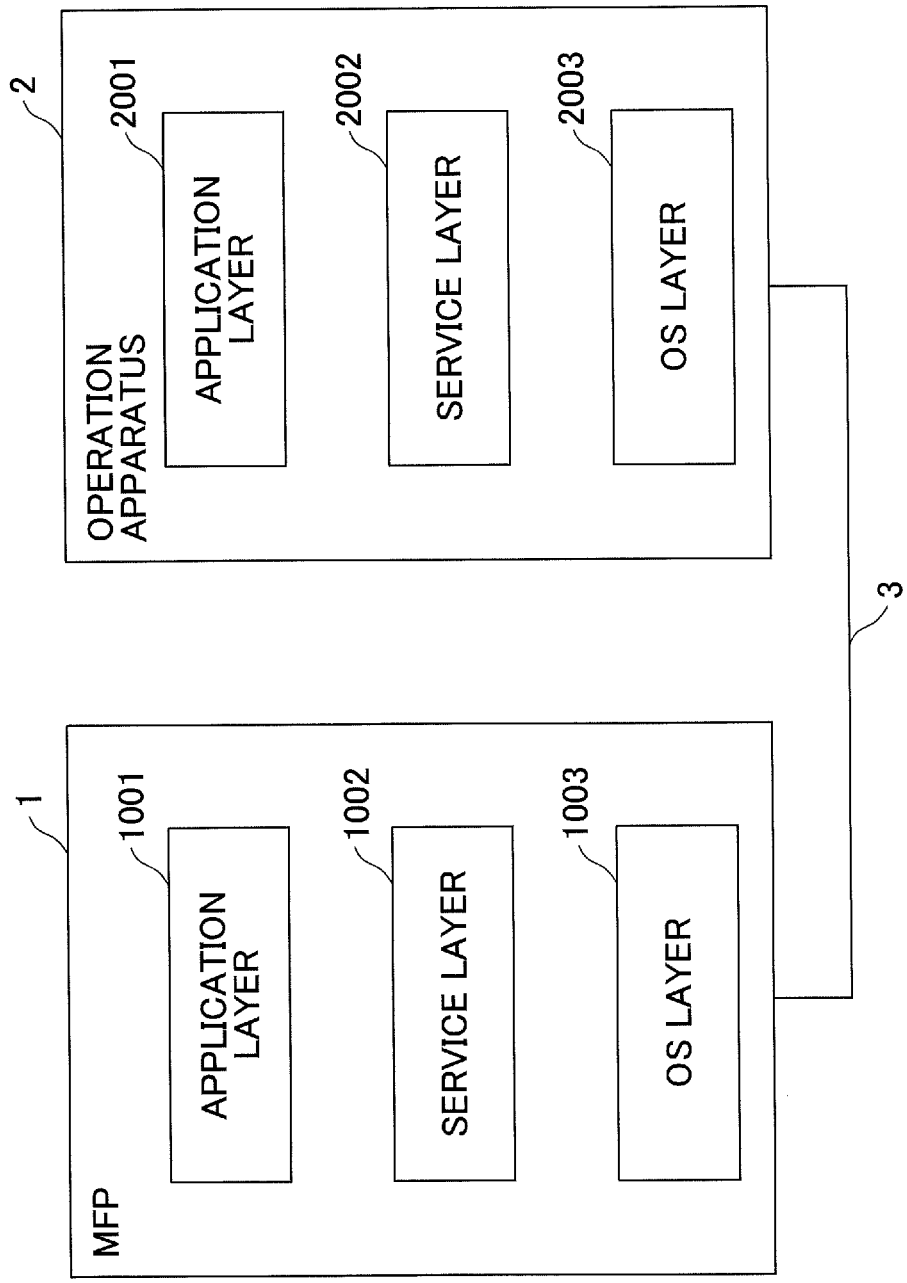
FIG. 3 is a software block diagram of the electronic device system according to the first embodiment of the present invention.

Next, a description is given of a software configuration of the electronic device system according to the present embodiment. FIG. 3 is a software block diagram of the electronic device system according to the present embodiment.

The MFP 1 includes an application layer 1001, a service layer 1002, and an OS layer 1003. These layers are formed by various types of software (programs) stored in the ROM 102 and the HDD 104. The functions of the respective layers are implemented as the CPU 101 executes the software of the respective layers.

The application layer 1001 provides functions of the MFP 1 to the user, by causing hardware elements to operate. In the following, the software (application software) forming the application layer 1001 is collectively referred to as an MFP application. Examples of the MFP application are a facsimile application for providing a facsimile function, a printer application for providing a printer function, a scanner application for providing a scanner function, and a copy application for providing a copy function. Furthermore, the MFP 1 sends, to the operation apparatus 2, image information for causing the operation apparatus 2 to display an operation screen used for operating these applications. The MFP 1 causes the application to operate according to an operation accepted from a user via an operation screen displayed by the operation apparatus 2 based on the image information that has been sent to the operation apparatus 2.

The service layer 1002 is interposed between the application layer 1001 and the OS layer 1003. The service layer 1002 provides an interface to the application layer 1001, for causing the hardware of the MFP 1 to operate. Specifically, the service layer 1002 accepts, from the application layer 1001, an operation request with respect to hardware, adjusts the accepted operation request, converts the operation request into a command that is interpretable by the OS layer 1003, and transfers the command, which is obtained as a result of the conversion, to the OS layer 1003. Examples of the operation request with respect to hardware are a request to the image reading unit to read an image and a request to the image forming unit to print the image. Note that in the present embodiment, the service layer 1002 also provides an interface for using hardware of the MFP 1, to an application layer 2001 of the operation apparatus 2.

The OS layer 1003 is formed by the OS of the MFP 1 and provides the basic functions for controlling the hardware of the MFP 1. As the OS layer 1003 executes a command received from the service layer 1002, the hardware of the MFP 1 executes an operation requested by the MFP application. In the present embodiment, the OS of the MFP 1 is a different type of OS from the OS of the operation apparatus 2 described later, and the OS of the MFP 1 does not need to have a reading aloud function. The OS of the MFP 1 is, for example, Linux (registered trademark); however, the OS of the MFP 1 is not limited as such.

The operation apparatus 2 includes the application layer 2001, a service layer 2002, and an OS layer 2003. These layers are formed by various types of software (programs) stored in the ROM 202 and the flash memory 204. The functions of the respective layers are implemented as the CPU 201 executes the software of the respective layers.

The application layer 2001 provides functions of the operation apparatus 2 to the user, by operating hardware elements. In the following, the software (application software) forming the application layer 2001 is collectively referred to as an operation application. Examples of the operation application are an emulator application for emulating the MFP application, and UI application for providing a UI. These operation applications can control the hardware and the functions of the MFP 1 by using the interface provided by the service layer 1002 of the MFP 1, without involving the application layer 1001 of the MFP 1.

The service layer 2002 is interposed between the application layer 2001 and the OS layer 2003. The service layer 2002 provides an interface to the application layer 2001, for causing the hardware of the operation apparatus 2 to operate. Specifically, the service layer 2002 accepts, from the application layer 2001, an operation request with respect to hardware, adjusts the accepted operation request, converts the operation request into a command that is interpretable by the OS layer 2003, and transfers the command, which is obtained as a result of the conversion, to the OS layer 2003. Examples of the operation request with respect to hardware are a request to the image reading unit to read an image and a request to the image forming unit to print the image.

The OS layer 2003 is formed by the OS of the operation apparatus 2 and provides the basic functions for controlling the hardware of the operation apparatus 2. As the OS layer 2003 executes a command received from the service layer 2002, the hardware of the operation apparatus 2 executes an operation requested by the operation application. In the present embodiment, the OS of the operation apparatus 2 is a different type of OS from the OS of the MFP 1, and the OS of the operation apparatus 2 has a function of reading aloud a message. The OS of the operation apparatus 2 is, for example, Android (registered trademark); however, the OS of the operation apparatus 2 is not limited as such.

As described above, in the present embodiment, different OS's are installed in the MFP 1 and the operation apparatus 2. For this reason, the communication between the MFP 1 and the operation apparatus 2 is not inter-process communication within the same apparatus; rather, the communication is performed between different apparatuses. By the communication between the MFP 1 and the operation apparatus 2, a command according to information and an instruction accepted by the operation apparatus 2 via an operation application, is sent from the operation apparatus 2 to the MFP 1, and operations of the MFP 1 are executed according to operations from the user. Furthermore, by the communication between the MFP 1 and the operation apparatus 2, information such as the operation status and the setting status of the MFP 1 is reported from the MFP 1 to the operation apparatus 2.

Note that the programs included in the MFP 1 and the operation apparatus 2 may be recorded in a computer-readable recording medium as files that are in an installable format or an executable format. Examples of such as recording medium are a Compact Disk (CD)-ROM, a Flexible Disk (FD), a CD-R, a Digital Versatile Disk (DVD), and a USB memory, etc. Furthermore, the programs included in the MFP 1 and the operation apparatus 2 may be provided or distributed via a network such as the Internet. Furthermore, the programs included in the MFP 1 and the operation apparatus 2 may be provided or distributed by being incorporated in a non-volatile recording medium in advance.

Figure 4:
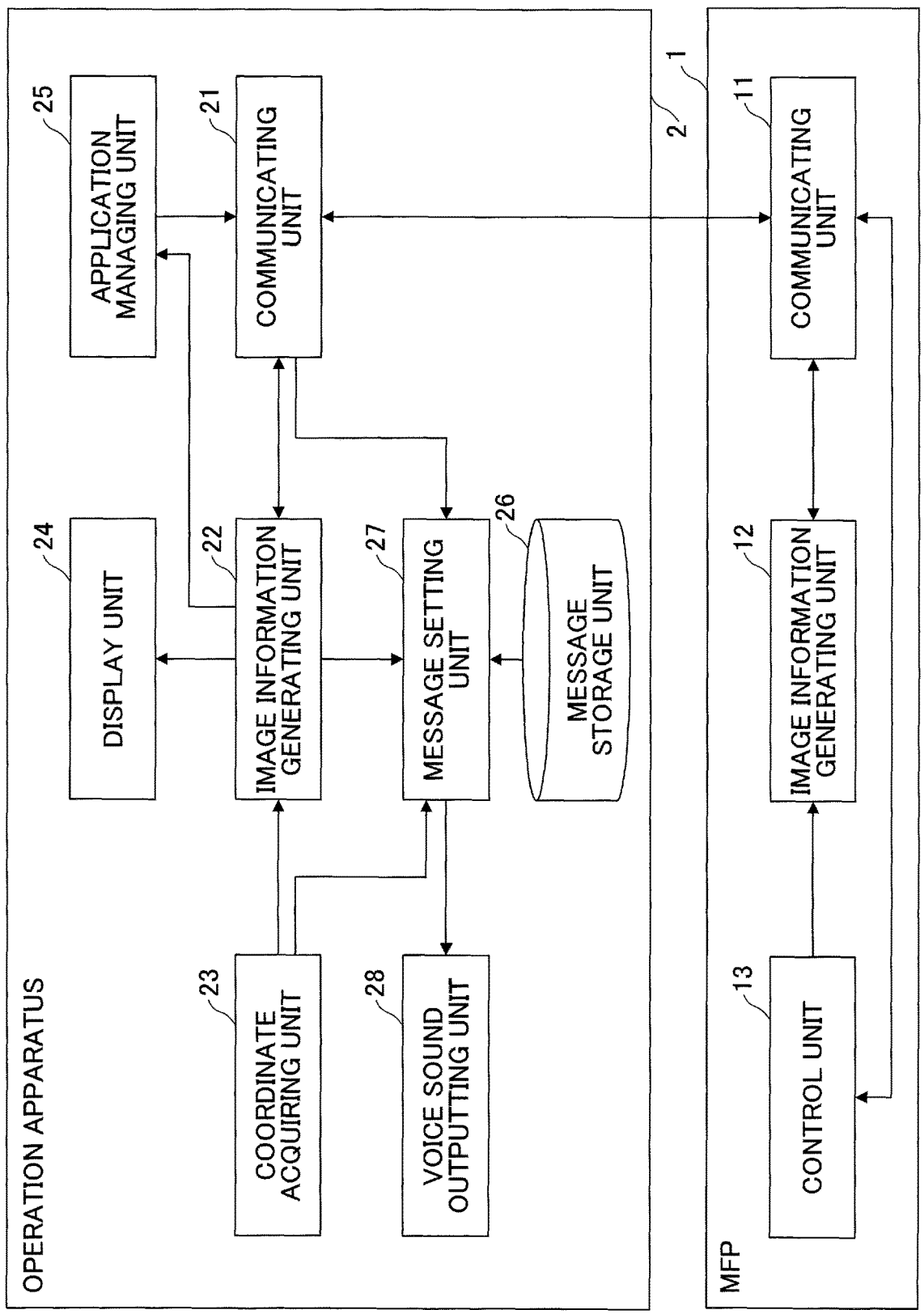
FIG. 4 is a functional block diagram of the electronic device system according to the first embodiment of the present invention.

Next, a description is given of a functional configuration of the electronic device system according to the present embodiment. FIG. 4 is a functional block diagram of the electronic device system according to the present embodiment.

The MFP 1 includes a communicating unit 11, an image information generating unit 12, and a control unit 13.

The communicating unit 11 is implemented as the CPU 101 executes programs to control the connection I/F 106. The communicating unit 11 communicates with the operation apparatus 2, and transmits and receives information with the operation apparatus 2.

The image information generating unit 12 is implemented as the CPU 101 executes programs. When the user requests the activation of an MFP application, the image information generating unit 12 generates image information (hereinafter referred to as "MFP image information") for displaying an MFP image (first image), based on the status of the MFP 1. An MFP image is an image according to the status of the MFP 1. Generating MFP image information corresponds to generating an MFP image.

The image information generating unit 12 stores, in advance, data (image data and text data, etc.) of a plurality of image elements (icons, buttons, frames, and messages, etc.) that can form the MFP image. The image information generating unit 12 combines these image elements based on the status of the MFP 1 (that is, selecting the image elements to be used and determining the arrangement of the selected image elements), to generate an MFP image according to the status of the MFP 1. The MFP image information includes data of the image elements for forming the MFP image, and arrangement information indicating the arrangement of the image elements. The arrangement of the image elements is, for example, expressed by coordinates in the screen.

The control unit 13 is implemented as the CPU 101 executes programs. The control unit 13 controls the hardware of the MFP 1 and the MFP application according to requests from the operation apparatus 2, and detects the status of the hardware of the MFP 1 and the MFP application.

The operation apparatus 2 includes a communicating unit 21, an image information generating unit 22, a coordinate acquiring unit 23, a display unit 24, an application managing unit 25, a message storage unit 26, a message setting unit 27, and a voice sound outputting unit 28.

The communicating unit 21 is implemented as the CPU 101 executes programs to control the connection I/F 106. The communicating unit 21 communicates with the MFP 1, and transmits and receives information with the MFP 1.

The image information generating unit 22 is implemented as the CPU 101 executes programs. The image information generating unit 22 generates image information (hereinafter referred to as "operation image information") of an operation image (second image). The operation image is an image that is displayed on the screen (the display part of a display included in the operation panel 208) of the operation panel 208. Generating the operation image information corresponds to generating an operation image.

The image information generating unit 22 stores, in advance, data (image data and text data, etc.) of a plurality of image elements (icons, buttons, frames, and messages, etc.) that can form the operation image. The image information generating unit 22 combines these image elements (that is, selecting the image elements to be used and determining the arrangement of the selected image elements), to generate and store an operation image. The operation image information includes data of the image elements for forming the operation image, and arrangement information indicating the arrangement of the image elements. The arrangement of the image elements is, for example, expressed by coordinates in a screen. Furthermore, the image information generating unit 22 stores, in the RAM 203, the operation image information of the operation image being displayed on the display unit 24 as described later, and identifies the image element arranged at the coordinates of a position on the operation panel 208 touched by a user.

Figure 5:
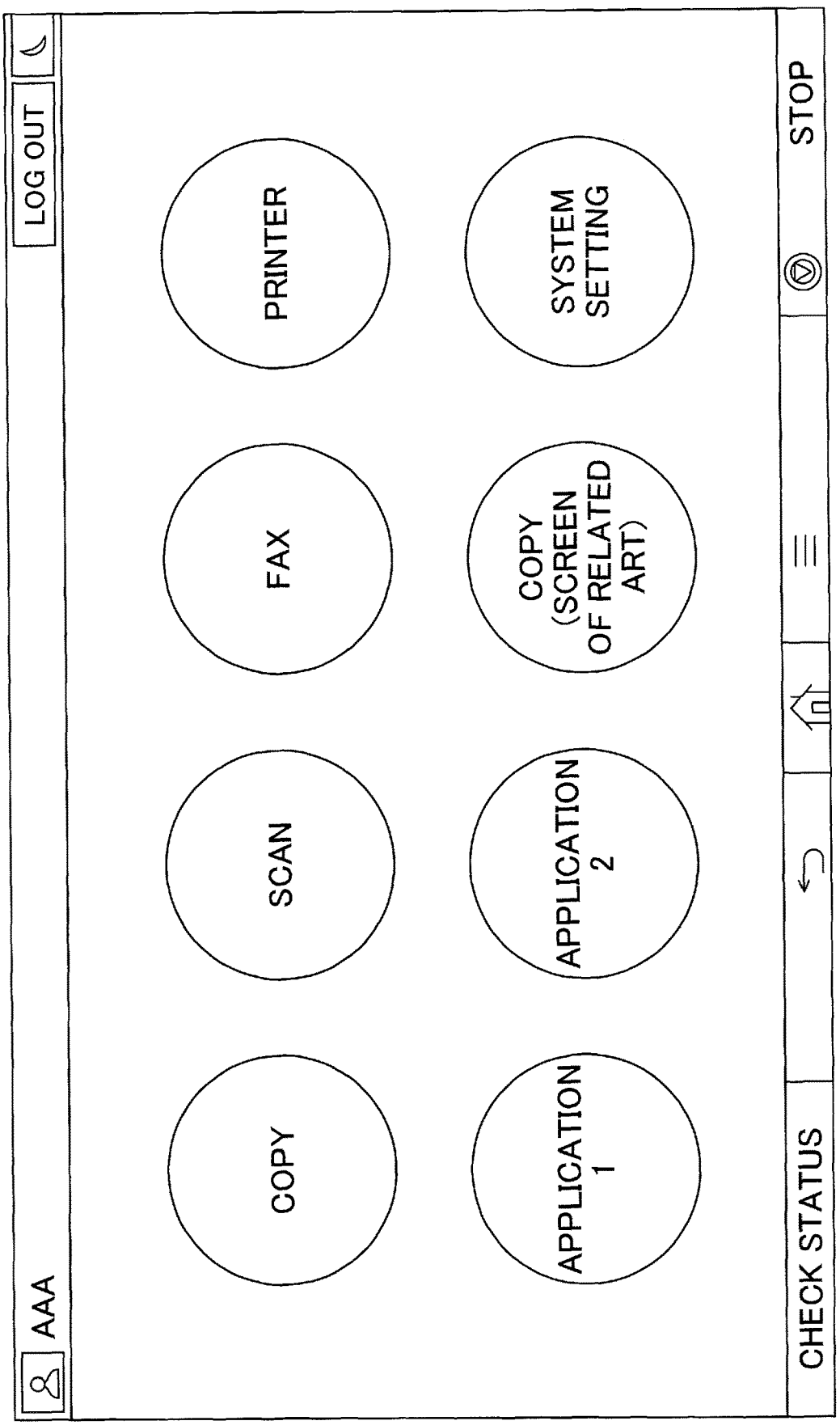
FIG. 5 illustrates an example of an operation image including images according to the first embodiment of the present invention.

FIG. 5 illustrates an example of an operation image. The operation image of FIG. 5 is the operation image of a home screen. The operation image includes banners arranged at the top and the bottom in FIG. 5, and activation buttons, which are for activating applications, arranged at predetermined positions.

The banner is an image element that is constantly included in the operation image, and the user ID of the user that has logged into the MFP 1, is described in the banner. In the example of FIG. 5, the user ID is "AAA".

In the banner arranged at the top part, a logout button and an energy saving mode button are arranged in the stated order from the left. The logout button is for logging out from the MFP 1. The energy saving mode button is for causing the MFP 1 to shift to an energy saving mode.

In the banner arranged at the bottom part, a status check button, a return button, a home button, a menu button, and an end button (stop) are arranged in the stated order from the left. The status check button is for displaying the status of the MFP 1. The return button is for returning to the screen that had been displayed immediately before the present screen. The home button is for displaying a home screen. The menu button is for displaying the operation menu of an application that is being activated. The end button is for ending the process being executed. Furthermore, the operation apparatus 2 may be provided with hard keys for providing functions corresponding to the respective buttons displayed in the banner, and the user may operate the hard keys. In this case, the buttons corresponding to the hard keys may not be displayed in the banner.

The activation buttons include activation buttons for activating operation applications and activation buttons for activating MFP applications. The activation buttons for activating operation applications include a copy button, a scan button, a fax button, a printer button, an application 1 button, and an application 2 button. Furthermore, the activation buttons for activating MFP applications include a copy button (a screen of the related art) and a system setting button. When the user touches an activation button to request the operation apparatus 2 to activate an application, the operation apparatus 2 displays an operation screen of an application corresponding to the activation button that has been touched.

For example, when the user touches the copy button, the copy application (operation application) is activated, and an operation image of a copy application as illustrated in FIG. 1, is displayed. As described above, when the user touches an image element (UI part) included in this operation image, a message according to the touched image element is read aloud.

As described above, there may be cases where a user desires to use the screen of the MFP application, instead of the screen of the operation application as illustrated in FIG. 1. In this case, the user is to touch the activation button of the MFP application.

When the user touches the activation button of the MFP application to request the operation apparatus 2 to activate the MFP application, the image information generating unit 22 generates image information of an operation image including an MFP image as the image element, based on the status of the MFP 1 and the MFP image information.

Figure 6:
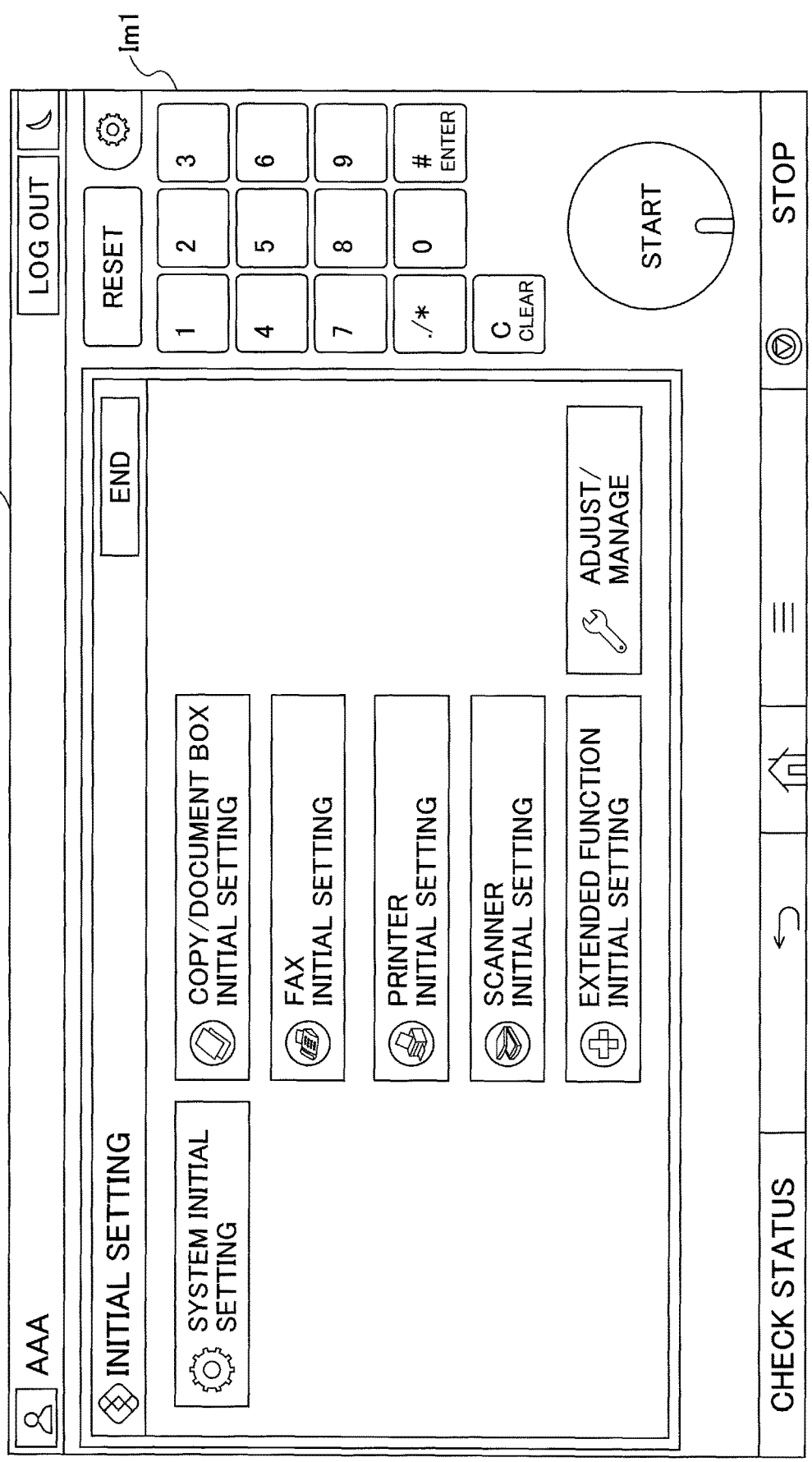
FIG. 6 illustrates an example of an operation image including a multifunction peripheral (MFP) image according to the first embodiment of the present invention.

FIG. 6 illustrates an example of an operation image including the MFP image. FIG. 6 is an operation image that is displayed when the system setting button of FIG. 5 (activation button of MFP application) is touched. An operation image Im2 of FIG. 6 includes banners and an MFP image Im1 arranged between the banners. The MFP image Im1 includes buttons (a fax initial setting button, etc.) for making various settings (a fax initial setting, etc.), a numeric pad, a reset button, and a start button, etc. A user who is a physically unimpaired person can touch the buttons included in the MFP image Im1 to operate the MFP 1.

Figure 7:
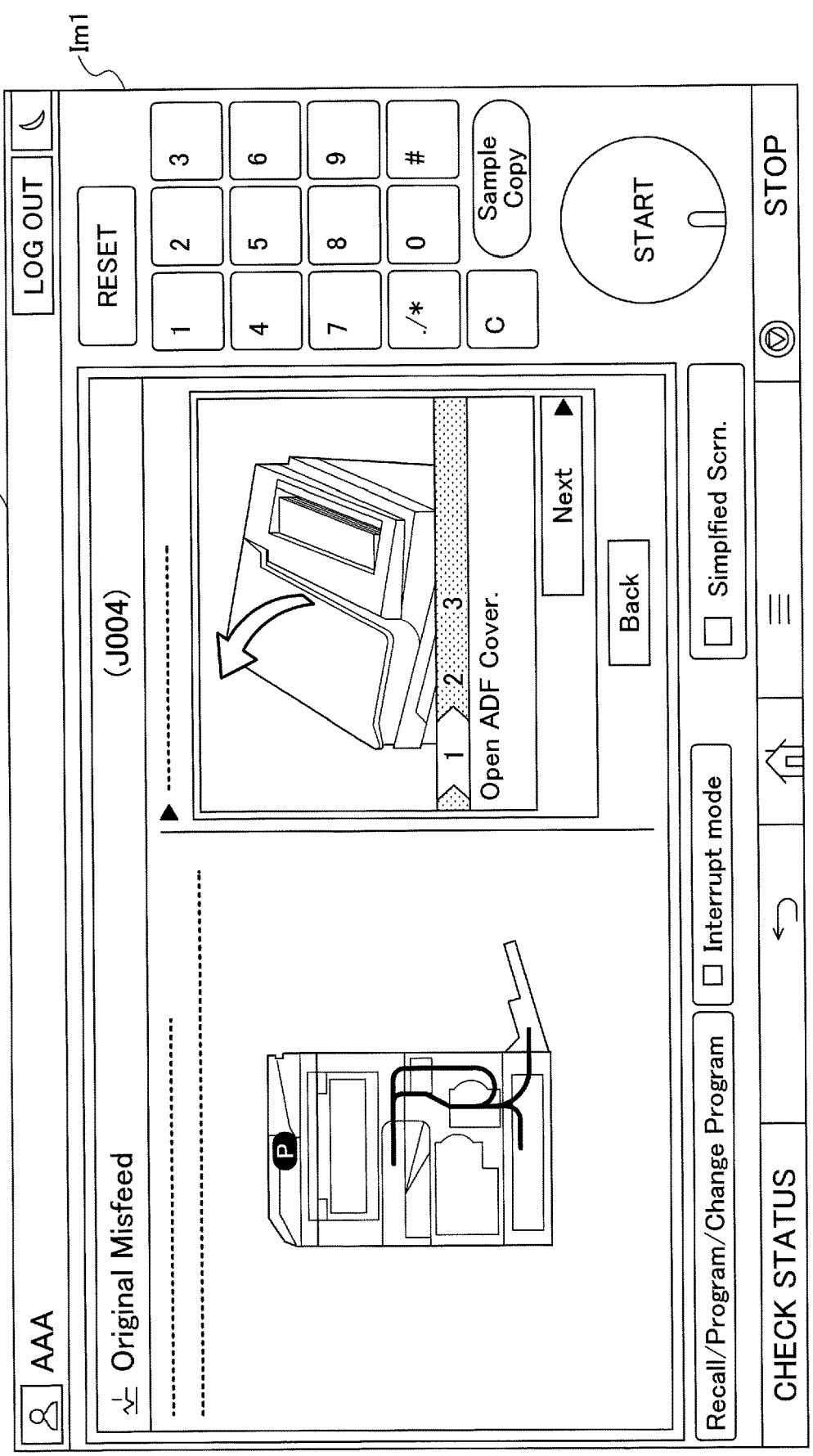
FIG. 7 illustrates another example of the operation image including the MFP image according to the first embodiment of the present invention.

FIG. 7 illustrates another example of the operation image including the MFP image. The operation image Im2 of FIG. 7 indicates a case where an error has occurred in the MFP 1. The operation image Im2 of FIG. 7 includes banners and the MFP image Im1 arranged between the banners. The MFP image Im1 includes a numeric pad, a reset button, and a start button, etc. Furthermore, the MFP image Im1 is displaying a countermeasure for the error. A user who is a physically unimpaired person can execute the countermeasure described in the MFP image Im1 to resolve the error and resume the operations of the MFP 1.

The MFP image Im1 of FIGS. 6 and 7 is an image generated by the MFP 1, and therefore messages with respect to the respective image elements included in the MFP image Im1, are not set. Therefore, even when the user touches an image element, a message corresponding to the touched image element is not read aloud. For this reason, when the operation image Im2 of the MFP application is displayed, a visually impaired person may not be able to recognize the status of the electronic device system, and may not be able to use the electronic device system. Accordingly, the operation apparatus 2 according to the present embodiment sets a message by which a visually impaired person can use the electronic device system, with respect to the entire MFP image Im1.

For example, the operation apparatus 2 sets a message, which says "A function that is not supported has been activated. Please tap the home button to return to the home screen.", with respect to the MFP image Im1 of FIG. 6. When the user touches the MFP image Im1, this message is read aloud. The user (visually impaired person) can touch the home button in response to this message, to display the home screen as illustrated in FIG. 5, which can be used by the visually impaired person. Note that the home button arranged in the banner is generated by the operation apparatus 2, and therefore when the user touches this home button, a corresponding message is read aloud. Accordingly, the visually impaired person can search for the home button by following the message, and touch the home button.

Furthermore, the operation apparatus 2 sets a message, which says "An error has occurred. Please contact the administrator.", with respect to the MFP image Im1 of FIG. 7. Accordingly, the user (visually impaired person) can recognize that an error has occurred in the MFP 1, and take appropriate actions for resolving the error.

The coordinate acquiring unit 23 is implemented as the CPU 201 executes programs to control the touch panel included in the operation panel 208. The coordinate acquiring unit 23 acquires coordinates of a position on the screen of the operation panel 208 touched by the user.

The display unit 24 is implemented as the CPU 201 executes programs to control the display included in the operation panel 208. The display unit 24 displays an operation image generated by the image information generating unit 22, on a screen.

The application managing unit 25 controls the activation and the termination of an operation application and an MFP application, and the switching of an operation image, according to instructions from the user.

The message storage unit 26 is implemented by the ROM 202, the RAM 203, and the flash memory 204, etc. The message storage unit 26 stores messages that are set in advance with respect to the respective image elements that can form the operation image. The image elements for which messages are set, may include a start button, an end button, an activation button for activating an MFP application, a setting button, a numeric pad, a reset button, a home button, and at least part of the frame of the operation image (for example, a tab), etc.

FIG. 8 illustrates an example of a first message table storing messages set in advance with respect to the image elements than can form the operation image. In the first message table of FIG. 8, an image element ID for identifying an image element, the name of the image element, and a message set with respect to the image element, are associated with each other. In the example of FIG. 8, an image element C1 having an image element ID "C1" is a "copy button" (activation button) for activating a copy application (operation application), for which a message saying "The copy application will be activated." is set. Note that an image element for which a message is set and the message set with respect to the image element, are not limited to the above example, Furthermore, the message storage unit 26 stores messages set in advance with respect to the respective statuses of the MFP 1. The statuses of the MFP 1 for which messages are set may include a status where an error, such as a paper jam and a system call, has occurred (error status), and a regular status (status in which an error has not occurred). The messages may be set for the respective types of errors that have occurred. Furthermore, the messages may be set for the respective types of MFP applications that have been activated and the respective types of MFP images displayed in the screen.

FIG. 9 illustrates an example of a second message table storing messages set in advance with respect to the statuses of the MFP 1. In the second message table of FIG. 9, a status ID for identifying a status of the MFP 1, the content of the status, and a message set with respect to the status, are associated with each other. In the example of FIG. 9, a status S1 having a status ID of "S1" is a status in which an "error 1" has occurred in the MFP 1, and a message saying "An error 1 has occurred." is set. In this manner, it is preferable to set a message for reporting the occurrence of an error and the type of the error, with respect to an error status. Furthermore, a status S3 having a status ID of "S3" is a status (regular status) of the MFP 1, in which "system setting application (MFP application) is activated", and a message saying "A function that is not supported has been activated. Please tap the home button to return to the home screen." is set. In this manner, with respect to the regular status, it is preferable to set a message for displaying a screen (a home screen, etc.) that can be used by a visually impaired person. Note that the status for which a message is set and the message set with respect to each status are not limited to the above examples. For example, with respect to an error status, a message may be set for reporting a countermeasure for the error that has occurred.

The message setting unit 27 sets a message with respect to each of the image elements forming the operation image, based on the operation image information. Specifically, the message setting unit 27 searches the message storage unit 26 by using, as the search key, the image element ID of each of the image elements included in the operation image information, and extracts the message set with respect to each of the image elements. The message setting unit 27 stores the extracted message in association with the image element ID and arrangement information. Accordingly, a message is set with respect to each of the image elements forming the operation image.

In the present embodiment, the message setting unit 27 treats an MFP image as one of the image elements (that is, one of the images) forming the operation image. That is, the message setting unit 27 sets one message for the entire MFP image. Specifically, the message setting unit 27 searches the message storage unit 26 by using the status of the MFP 1 as the search key, and extracts the message set with respect to the status of the MFP 1. The message setting unit 27 stores the extracted message in association with the MFP image. Accordingly, a message according to the status of the MFP 1, is set with respect to the MFP image included in the operation image. In the following, it is assumed that an MFP image is included in the image elements of the operation image.

FIG. 10 illustrates an example of a message setting table storing messages set with respect to the respective image elements of the operation image. In the message setting table of FIG. 10, the image element ID, the name of the image element, the arrangement information of the image element, and the message set with respect to the image element, are associated with each other. In the example of FIG. 10, an image element C2 having an image element ID "C2" is a start button, and a message saying "A process will be started." is set. Furthermore, an image element Im1 having an image element ID "Im1" is an MFP image, and a message saying "A function that is not supported has been activated. Please tap the home button to return to the home screen." is set.

The voice sound outputting unit 28 is implemented as the CPU 201 executes programs (OS) to control the speaker 209. The voice sound outputting unit 28 outputs the voice sound of a message set with respect to an image element of an operation image touched by a user.

Figure 11:
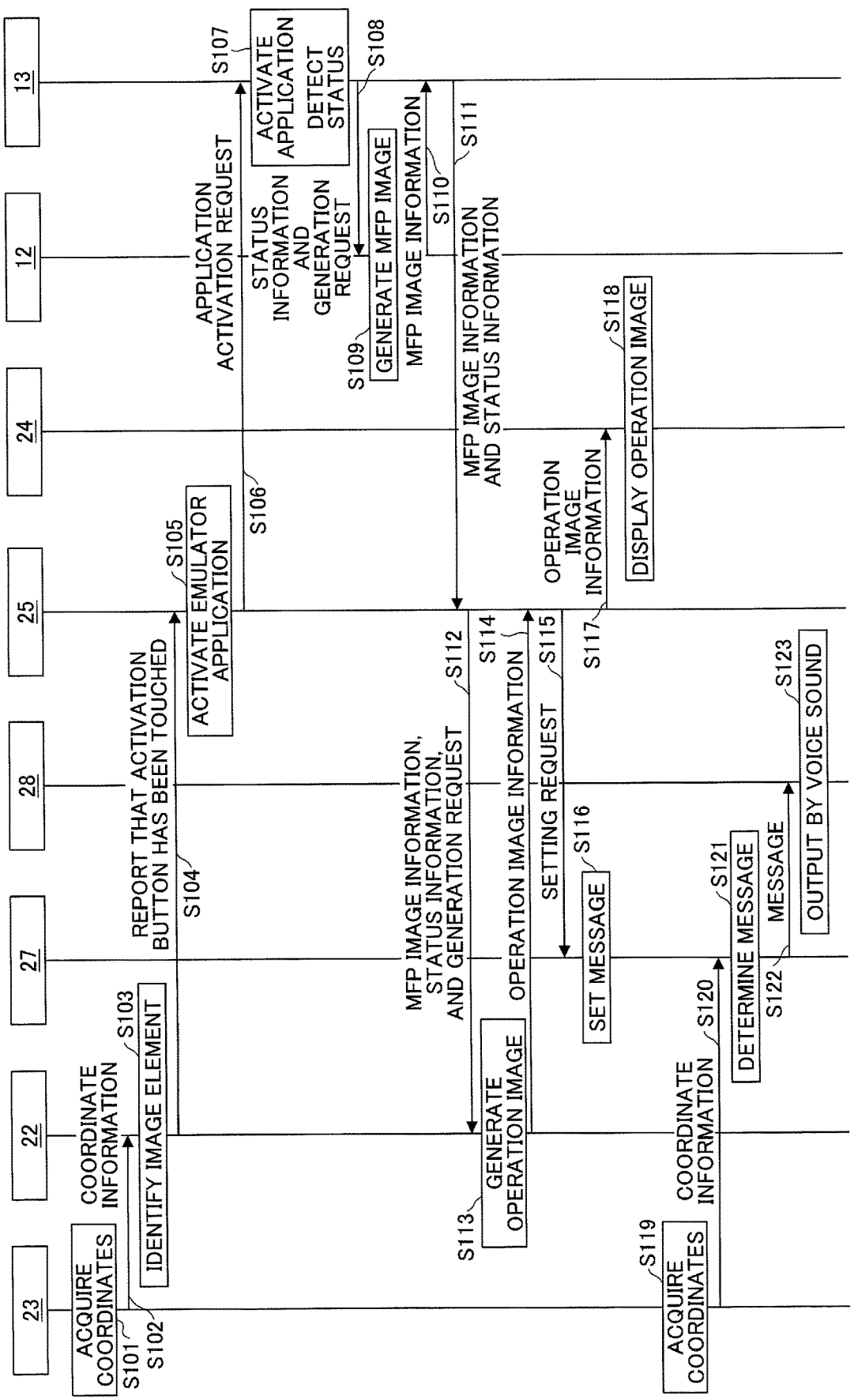
FIG. 11 is a sequence diagram of an operation of the electronic device system according to the first embodiment of the present invention.

Next, a description is given of operations of the electronic device system according to the present embodiment. FIG. 11 is a sequence diagram of an operation of the electronic device system according to the present embodiment. In the following, it is assumed that a message according to whether an error has occurred (error status or regular status) is set, with respect to the MFP image included in the operation image.

When the user touches the operation screen displayed on the operation panel 208, first, the coordinate acquiring unit 23 calculates and acquires the coordinates of a position on the operation screen touched by the user (step S101). The coordinate acquiring unit 23 transfers coordinate information indicating the acquired coordinates, to the image information generating unit 22 (step S102).

When the image information generating unit 22 receives the coordinate information, the image information generating unit 22 identifies the image element in the operation image touched by the user, based on the received coordinate information and the arrangement information of each image element in the operation image stored in the RAM 203 (step S103). The image information generating unit 22 identifies the image element arranged at the coordinates indicated by the coordinate information, as the image element touched by the user. Here, it is assumed that the system setting button for activating a system setting application in the home screen of FIG. 5, has been touched.

When the image information generating unit 22 identifies the system setting button for activating a system setting application, as the image element touched by the user, the image information generating unit 22 reports that the activation button of the system setting application has been touched, to the application managing unit 25 (step S104).

When the application managing unit 25 receives the report that the activation button of the system setting application has been touched, the application managing unit 25 activates an emulator application for emulating the system setting application (step S105). Furthermore, because the system setting application to be activated is an MFP application, the application managing unit 25 sends an activation request for activating the system setting application, to the MFP 1 via the communicating unit 21 (step S106).

When the control unit 13 of the MFP 1 receives the activation request for activating the system setting application via the communicating unit 11, the control unit 13 activates the system setting application, and detects the status of the system setting application in the MFP 1 (step S107). For example, the control unit 13 detects the status of the hardware and the software relevant to the system setting application. The control unit 13 transfers status information, which indicates the status of the system setting application, to the image information generating unit 12, and requests the image information generating unit 12 to generate an MFP image for displaying an operation screen of the system setting application, on the operation apparatus 2 (step S108). As described above, it is assumed that the status indicated by the status information is either an error status or a regular status.

The image information generating unit 12 generates an MFP image of the system setting application according to the status indicated by the status information, in response to the generation request from the control unit 13 (step S109). When the status information indicates an error status, the image information generating unit 12 generates an MFP image of the system setting application in an error status. When the status information indicates a regular status, the image information generating unit 12 generates an MFP image of the system setting application in a regular status. The image information generating unit 12 transfers the MFP image information of the generated MFP image, to the control unit 13 (step S110). The control unit 13 sends the MFP image information and the status information to the operation apparatus 2 via the communicating unit 11 (step S111).

The application managing unit 25 of the operation apparatus 2 receives, via the communicating unit 21, the MFP image information and the status information sent from the MFP 1, transfers the received information to the image information generating unit 22, and requests the image information generating unit 22 to generate an operation image of the system setting application (step S112). The image information generating unit 22 generates an operation image of the system setting application including the MFP image and image elements other than the MFP image such as a home button displayed in the banner, according to the status of the system setting application, based on the transferred MFP image information and status information, in response to the generation request from the application managing unit 25 (step S113). The image information generating unit 22 returns the generated operation image to the application managing unit 25 (step S114). The application managing unit 25 transfers the returned operation image information and the status information to the message setting unit 27, and requests the message setting unit 27 to set a message (step S115). Here, in order to display an operation image including the MFP image received from the MFP 1, the application managing unit 25 requests the message setting unit 27 to acquire a message from the second message table. That is, the application managing unit 25 stores an indication as to whether the MFP image received from the MFP 1 is to be included in the operation image to be displayed, and the acquisition destination of the message, in association with each other.

In response to the setting request from the application managing unit 25, the message setting unit 27 acquires, from the second message table in the message storage unit 26, a message associated with the status indicated by the transferred status information. The message setting unit 27 sets the acquired message, the ID, the name, and the arrangement information of the image element included in the transferred operation image information, in association with each other, in the message setting table in the message storage unit 26 (step S116). For example, when the system setting application is in the regular status, the message setting unit 27 acquires a message saying "A function that is not supported has been activated. Please tap the home button to return to the home screen." corresponding to the status of "system setting application is activated" in the second message table. Then, the message setting unit 27 sets the acquired message in the message setting table in the message storage unit 26, in association with the image element ID, the name, and the arrangement information included in the operation image information. Conversely, when the system setting application is in an error status, the message setting unit 27 acquires a message saying "An error has occurred. Please contact the administrator." corresponding to the status of "error 1" in the second message table. Then, the message setting unit 27 sets the acquired message in the message setting table. Furthermore, the application managing unit 25 may acquire the message from the second message table based on the status information, and transfer the message to the message setting unit 27.

Furthermore, when the message setting unit 27 receives the operation image information, the message setting unit 27 refers to the message storage unit 26, and sets the message with respect to each of the image elements excluding the MFP image, included in the operation image. For example, the message setting unit 27 registers a message saying "The home application will be activated" with respect to the home button to be displayed in the banner, in the message setting table.

Next, the application managing unit 25 transfers the operation image information of the operation image to the display unit 24 (step S117). When the display unit 24 receives the operation image information, the display unit 24 displays an operation image on a screen, based on the received operation image information (step S118).

Thereafter, when the user touches the screen of the operation panel 208, the coordinate acquiring unit 23 calculates and acquires the coordinates of a position on the screen touched by the use (step S119). The coordinate acquiring unit 23 transfers the coordinate information indicating the acquired coordinates, to the message setting unit 27 (step S120).

When the message setting unit 27 receives the coordinate information, the message setting unit 27 identifies the image element of the operation image touched by the user, based on the received coordinate information and the arrangement information of each of the image elements in the operation image (including an MFP image). The image information generating unit 22 identifies the image element arranged at the coordinates indicated by the coordinate information, as the image element touched by the user. Then, the message setting unit 27 refers to the message setting table, and determines the message set with respect to the identified image element, as the message to be output by voice sound (step S121). The message setting unit 27 transfers the determined message (text data) to the voice sound outputting unit 28 (step S122).

When the voice sound outputting unit 28 receives the message, the voice sound outputting unit 28 outputs the received message by voice sound from the speaker 209 (step S123). Accordingly, when the user touches the MFP image, a message is output by voice sound according to the status of the system setting application that is the activation target. Furthermore, although not indicated in the example of FIG. 11, after step S119, a report that the image element has been touched is sent to the application managing unit 25, similar to steps S102 through S104. The application managing unit 25 implements control to activate or terminate the operation application or the MFP application, and switch the operation image, according to the image element touched by the user. Furthermore, when the operation image, which has been generated based on the MFP image sent from the MFP 1, is displayed, the application managing unit 25 may implement control so as not to activate or terminate the operation application or the MFP application, and not to switch the operation image, even when a report, which indicates that the image element has been touched, is received. Accordingly, it is possible to prevent erroneous operations by a visually impaired user.

As described above, according to the present embodiment, the operation apparatus 2 is able to set a message according to the status of the MFP 1 indicating whether the MFP application has been activated, and the status of the MFP application to be activated, with respect to the MFP image generated by the MFP 1 (electronic device). Accordingly, the operation apparatus 2 is able to output, by voice sound (read aloud), the message set with respect to the MFP image, when the MFP image displayed on the screen of the operation apparatus 2 is touched by the user. The user of the operation apparatus 2 obtains, by voice sound, the information (message) relevant to the image element including the MFP image. Therefore, even when the user is a visually impaired person, the user can easily operate the MFP 1, by using the operation apparatus 2.

Note that although not indicated in the example of FIG. 11, the image element ID, the name, and the arrangement information of the activation button of the system setting application in the home screen, and the message corresponding to this activation button set in the first message table, are set in the message setting table. Therefore, when the user touches an activation button of the system setting application, the voice sound outputting unit 28 preferably outputs, by voice sound, the message set with respect to the activation button (for example, "The system setting application will be activated."). The voice sound output of this message is implemented by the same processes as those of steps S120 through S123.

Furthermore, in the example of FIG. 11, it is assumed that the MFP system setting is activated in the background, and therefore the process of activating the system setting application is not performed. When the system setting application is not activated, the MFP 1 is to execute the process of activating the system setting application in response to an application activation request. Note that the electronic device system according to the present embodiment operates in the same manner as illustrated in FIG. 11, also in the case of an MFP application other than the system setting application.

Second Embodiment

Figure 12:
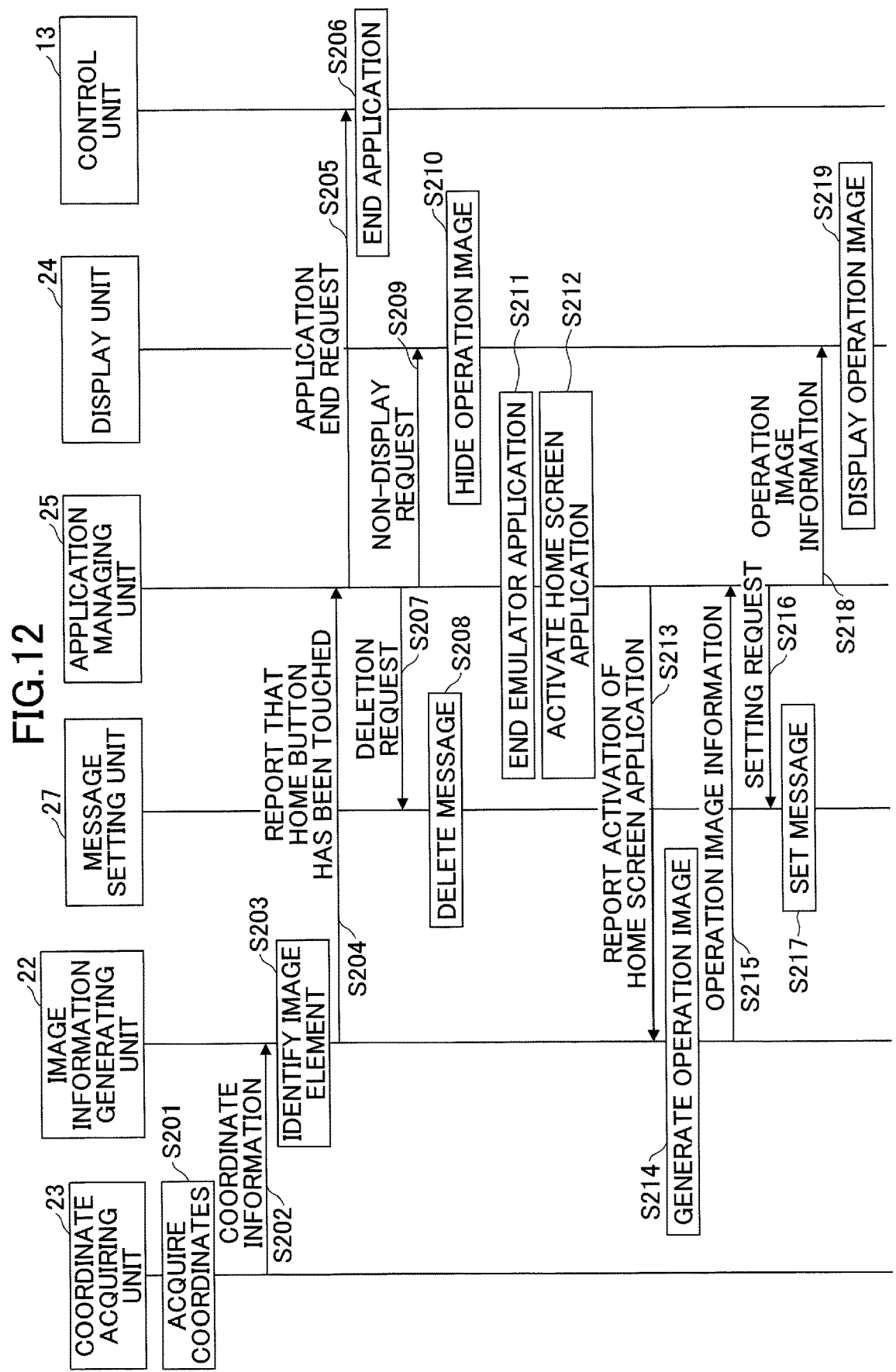
FIG. 12 is a sequence diagram of an example of an operation of the electronic device system according to a second embodiment of the present invention.

A description is given of the electronic device system according to a second embodiment, by referring to FIG. 12.

In the first embodiment, a description is given of the operation in which the MFP application is activated by the user's operation. In the present embodiment, a description is given of an operation in which the MFP application is terminated by the user's operation. Note that the configuration of the electronic device system according to the present embodiment is the same as that of the first embodiment.

FIG. 12 is a sequence diagram of an example of an operation of the electronic device system according to the present embodiment. In the following, it is assumed that at the starting time point of the operation, the system setting application is activated on the emulator application, and an operation image including an MFP image for which a message is set, is displayed on the screen.

When the user touches the screen of the operation panel 208, first, the coordinate acquiring unit 23 calculates and acquires the coordinates of the position on the screen touched by the user (step S201). The coordinate acquiring unit 23 transfers the coordinate information indicating the acquired coordinates, to the image information generating unit 22 (step S202).

When the image information generating unit 22 receives the coordinate information, the image information generating unit 22 identifies the image element of the operation image touched by the user, based on the received coordinate information and the arrangement information of each image element of the operation image (step S203). The image information generating unit 22 identifies the image element arranged at the coordinates indicated by the coordinate information, as the image element touched by the user. Here, it is assumed that the home button for displaying the home screen has been touched. Displaying the home screen corresponds to terminating the system setting application being activated on the emulator.

When the image information generating unit 22 identifies that the image element touched by the user is the home button, the image information generating unit 22 sends a report indicating that the home button has been touched, to the application managing unit 25 (step S204). Note that when the home button is a hard key, and the image information generating unit 22 identifies that the home button has been touched by the user, and the image information generating unit 22 sends a report indicating that the home button has been touched, to the application managing unit 25.

When the application managing unit 25 receives the report that the home button has been touched, the activated system setting application is an MFP application, and therefore the application managing unit 25 sends a termination request to terminate the system setting application to the MFP 1 via the communicating unit 21 (step S205). When the control unit 13 of the MFP 1 receives the termination request to terminate the system setting application via the communicating unit 11, the control unit 13 terminates the system setting application (step S206).

When the application managing unit 25 receives the report that the home button has been touched, the application managing unit 25 requests the message setting unit 27 to delete the message (step S207). When the message setting unit 27 receives the request to delete the message, the message setting unit 27 deletes the message of each of the image elements set in the message setting table (including an MFP image) (step S208). Note that it is not necessary to delete a message corresponding to the image element that is constantly displayed in the banner.

Furthermore, the application managing unit 25 requests the display unit 24 to hide (non-display) the operation image (step S209). When the display unit 24 receives the request to hide the operation image, the display unit 24 hides the operation image of the displayed system setting application (step S210).

Furthermore, the application managing unit 25 terminates the emulator application of the system setting application (step S211), activates a home screen application for displaying the home screen (step S212), and sends a report that the home screen application has been activated, to the image information generating unit 22 (step S213). Furthermore, although not indicated in the example of FIG. 12, in step S211, the application managing unit 25 sends a request to terminate the system setting application to the MFP 1 via the communicating unit 21. When the control unit 13 of the MFP 1 receives the termination request via the communicating unit 11, the control unit 13 terminates the system setting application.

When the image information generating unit 22 receives the report that the home screen application has been activated, the image information generating unit 22 generates an operation image of the home screen application (step S214). The image information generating unit 22 returns operation image information of the generated operation image, to the application managing unit 25 (step S215). The application managing unit 25 transfers the returned operation image information to the message setting unit 27 and requests the message setting unit 27 to set a message (step S216). Here, an operation image, which does not include the MFP image received from the MFP 1, is displayed, and therefore the application managing unit 25 requests the message setting unit 27 to acquire a message from the first message table.

When the message setting unit 27 receives the operation image information, the message setting unit 27 acquires a message corresponding to each of the image elements included in the operation image, from the first message table in the message storage unit 26. Then, the message setting unit 27 sets the ID, the name, and the arrangement information of each image element, in the message setting table in association with the acquired message (step S217). For example, a message such as "The copy application will be activated." is set with respect to the copy button. Note that this operation image does not include an MFP image.

Furthermore, the application managing unit 25 transfers the operation image information to the display unit 24 (step S218). When the display unit 24 receives the operation image information, the display unit 24 displays the operation image on the screen, based on the received operation image information (step S219).

Thereafter, when the user touches the screen of the operation panel 208, a message set with respect to the touched image element is output by voice sound.

As described above, according to the present embodiment, when the user touches the button for terminating the MFP application, that is, when the user instructs to terminate the MFP application, the display unit 24 hides the operation image including the MFP image. Furthermore, the message setting unit 27 deletes the message set with respect to each of the image elements of the operation image. Then, a new operation image according to the user's operation is displayed, and new message is set for each of the image elements of the operation image. In this manner, according to the present embodiment, a new operation image is automatically generated according to an instruction from the user, and a new message can be automatically set with respect to the new operation image.

Note that in the example of FIG. 12, after the original operation image is hidden, a new operation image is generated and displayed on the screen; however, the original operation image may be displayed on the screen until it becomes possible to display the new operation image. The activation of the home screen application (step S210) may be executed at any timing after receiving the report that the home button has been touched (after step S204).

Furthermore, the electronic device system according to the present embodiment operates in the same manner as that indicated FIG. 12, in a case of an MFP application other than the system setting application. The image information generating unit 22 may store the operation image of the generated home application in the RAM 203, and after receiving the report that the home button has been touched, the image information generating unit 22 may acquire the operation image from the RAM 203.

Third Embodiment

Figure 13:
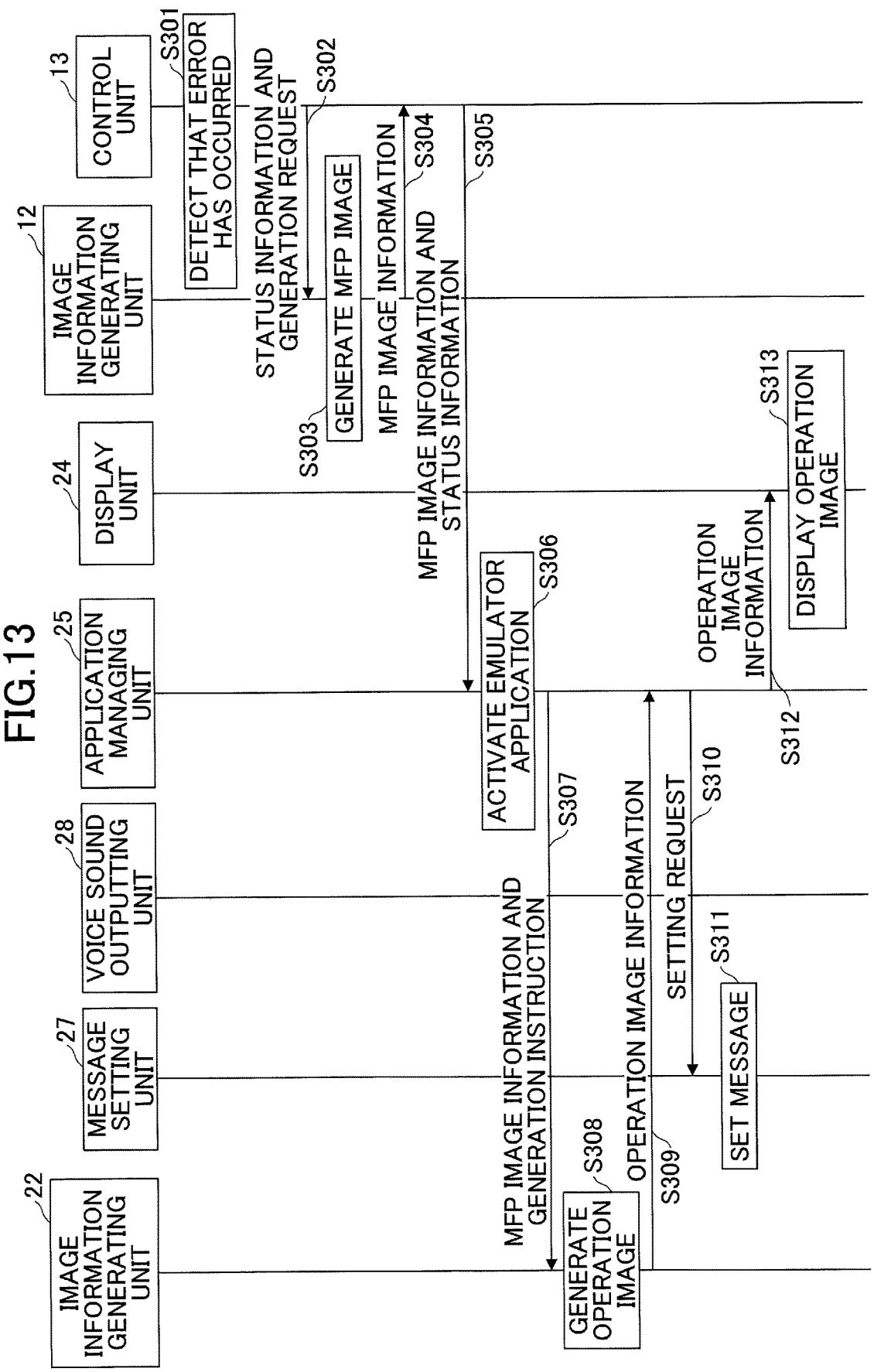
FIG. 13 is a sequence diagram of an example of an operation of the electronic device system according to a third embodiment of the present invention.

A description is given of the electronic device system according to a third embodiment, by referring to FIG. 13. In the first embodiment, a description is given of a case where a new message is set at the timing when an operation from the user is accepted. In the present embodiment, a description is given of a case in which a new message is automatically set at a timing when the status of the MFP 1 changes. Note that the configuration of the electronic device system according to the present embodiment is the same as that of the first embodiment.

FIG. 13 is a sequence diagram of an example of an operation of the electronic device system according to the present embodiment. In the following, it is assumed that an error has occurred in the MFP 1 while the MFP 1 is executing a predetermined function. For example, it is assumed that a user uses a copy application to instruct the execution of a copy process with respect to an operation screen of the copy application, and while the MFP 1 is executing the copy process according to the user's instruction, an error such as paper jam occurs in the MFP 1.

When an error occurs in the MFP 1, the control unit 13 of the MFP 1 detects the occurrence of the error (step S301). That is, the control unit 13 detects that the status of the MFP 1 has changed from the regular status to the error status.

When the control unit 13 detects the change in the status, the control unit 13 transfers the status information to the image information generating unit 12 (step S302).

When the image information generating unit 12 receives the status information, the image information generating unit 12 generates an MFP image of an error application for displaying operation procedures for resolving the error, according to the status (error status) indicated by the status information (step S303).

The image information generating unit 12 transfers the MFP image information of the generated MFP image, to the control unit 13 (step S304). The control unit 13 sends the MFP image information and the status information to the operation apparatus 2 via the communicating unit 11 (step S305).

The application managing unit 25 of the operation apparatus 2 receives the MFP image information and the status information via the communicating unit 21. The received status information indicates an error status, and therefore the application managing unit 25 activates an emulator application for emulating an error application (step S306). Then, the application managing unit 25 transfers the MFP image information to the image information generating unit 22 and requests the image information generating unit 22 to generate an operation image of the error application (step S307).

The image information generating unit 22 generates an operation image including the MFP image, based on the transferred MFP image information (step S308). The image information generating unit 22 returns the operation image information of the generated operation image to the application managing unit 25 (step S309). The application managing unit 25 transfers the returned operation image information and the status information to the message setting unit 27, and requests the message setting unit 27 to set a message (step S310). Here, in order to display an operation image including the MFP image received from the MFP 1, the application managing unit 25 requests the message setting unit 27 to acquire a message from the second message table.

The message setting unit 27 acquires, from the second message table in the message storage unit 26, a message saying "An error has occurred. Please contact the administrator.", which is associated with the status of the error 1 indicated by the transferred status information, in response to the setting request from the application managing unit 25. Then, the message setting unit 27 sets the acquired message, the ID, the name, and the arrangement information of the image element included in the transferred operation image information, in association with each other, in the message setting table in the message storage unit 26 (step S311).

Furthermore, when the message setting unit 27 receives the operation image information, the message setting unit 27 refers to the message storage unit 26, and sets the message with respect to each of the image elements excluding the MFP image, included in the operation image.

Next, the application managing unit 25 transfers the operation image information of the operation image to the display unit 24 (step S312). When the display unit 24 receives the operation image information, the display unit 24 displays the operation image on a screen, based on the received operation image information (step S313).

Thereafter, when the user touches the screen of the operation panel 208, a message set with respect to the touched image element is output by voice sound.

Figure 14:
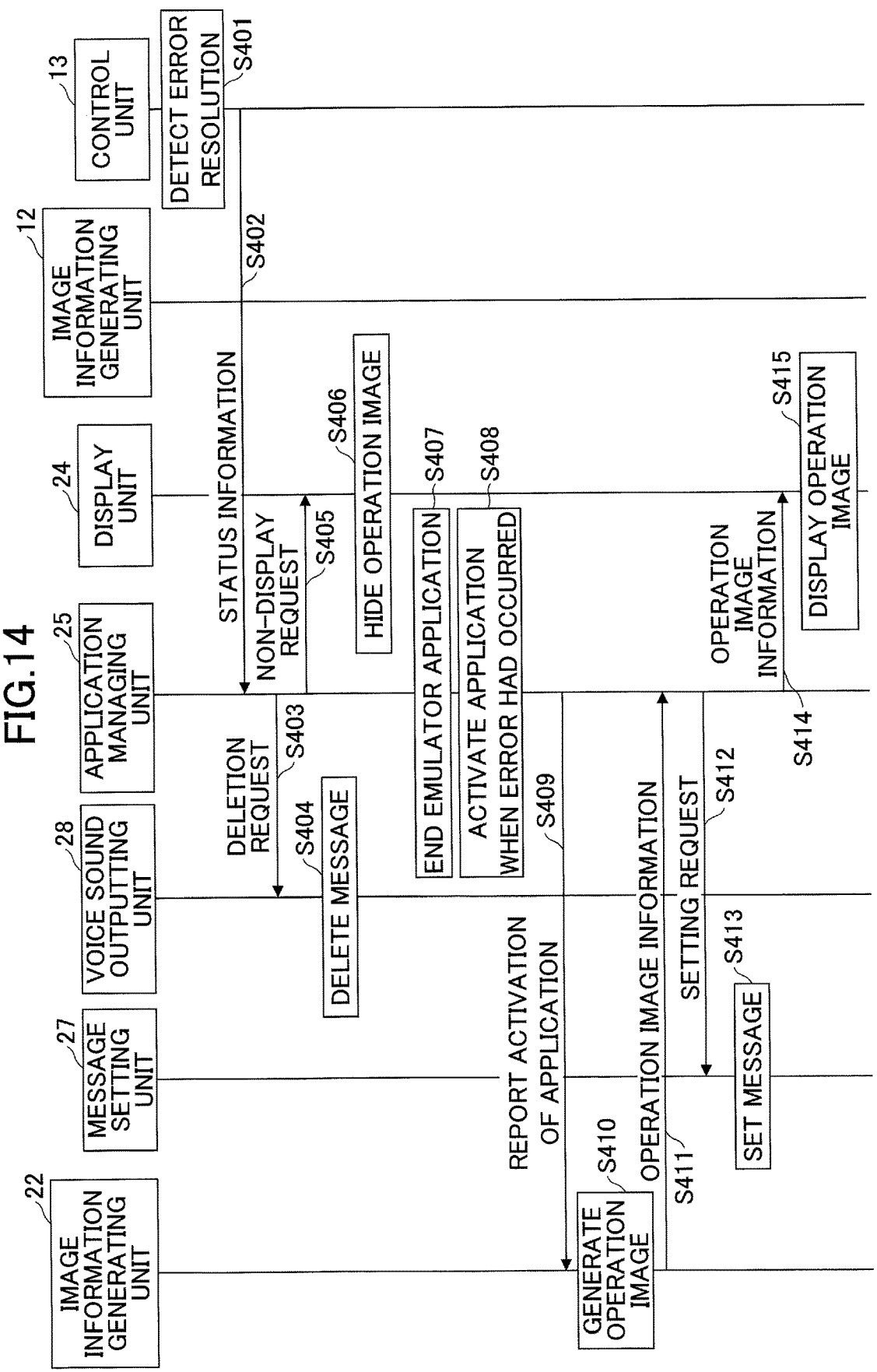
FIG. 14 is a sequence diagram of an example of an operation of the electronic device system according to the third embodiment of the present invention.

FIG. 14 is a sequence diagram of an example of an operation of the electronic device system according to the present embodiment. In the following, it is assumed that the error, which has occurred while the MFP 1 is executing a predetermined function, has been resolved. For example, it is assumed that the user has used the copy application to instruct the execution of a copy process, and an error such as paper jam, which has occurred while the MFP 1 is executing the copy process, has been resolved.

When the error of the MFP 1 is resolved, the control unit 13 of the MFP 1 detects that the error has been resolved (step S401). That is, the control unit 13 detects that the status of the MFP 1 has changed from the error status to the regular status.

When the control unit 13 detects the change in the status, the control unit 13 sends status information indicating the detected status (regular status) of the MFP 1, to the operation apparatus 2 via the communicating unit 11 (step S402). The application managing unit 25 of the operation apparatus 2 receives the status information via the communicating unit 21.

When the error is resolved and the application managing unit 25 receives the status information indicating the regular status, the application managing unit 25 requests the message setting unit 27 to delete the message (step S403). When the message setting unit 27 receives the request to delete the message, the message setting unit 27 deletes the message of each of the elements (including an MFP image) set in the message setting table (step S404). The application managing unit 25 requests the display unit 24 to hide the operation image (step S405). When the display unit 24 receives the request to hide the operation image, the display unit 24 hides the operation image of the displayed system setting application (step S406).

Furthermore, the application managing unit 25 determines that the error has been resolved based on the received status information, terminates the emulator application (step S407), and activates the application that had been used when the error had occurred (step S408). Here, the error had occurred while the copy had been executed after the user had operated the operation screen of the copy application. Therefore, the application managing unit 25 activates the copy application, and reports to the image information generating unit 22 that the copy application has been activated (step S409).

When the image information generating unit 22 receives the report that the copy application has been activated, the image information generating unit 22 generates an operation image of the copy application (step S410). The image information generating unit 22 returns the operation image information of the generated operation image to the application managing unit 25 (step S411). The application managing unit 25 transfers the returned operation image information to the message setting unit 27, and requests the message setting unit 27 to set a message (step S412). Here, in order to display an operation image that does not include the MFP image received from the MFP 1, the application managing unit 25 requests the message setting unit 27 to acquire a message from the first message table.

When the message setting unit 27 receives the operation image information, the message setting unit 27 acquires, from the first message table in the message storage unit 26, a message associated with each of the image elements included in the operation image. Then, the message setting unit 27 sets the ID, the name, and the arrangement information of each image element in association with the acquired message, in the message setting table (step S413). For example, the message setting unit 27 sets a message saying "Copying will start." with respect to the start button for starting the copy operation.

Furthermore, when the message setting unit 27 receives the operation image information, the message setting unit 27 refers to the message storage unit 26, and sets the message with respect to each of the image elements excluding the MFP image, included in the operation image.

Furthermore, the application managing unit 25 transfers the operation image information to the display unit 24 (step S414). When the display unit 24 receives the operation image information, the display unit 24 displays the operation image on a screen, based on the received operation image information (step S415).

Thereafter, when the user touches the screen of the operation panel 208, a message set with respect to the touched image element is output by voice sound.

As described above, according to the present embodiment, when the error status of the MFP 1 is detected, the image information generating unit 12 of the MFP 1 generates a new MFP image according to the error status. The image information generating unit 22 of the operation apparatus 2 generates a new operation image including a new MFP image. Furthermore, the message setting unit 27 generates a new message corresponding to the error status with respect to the new MFP image. In this manner, according to the present embodiment, it is possible to automatically generate a new operation image according to the error status, at the timing of when an error occurs in the MFP 1, and set a new message corresponding to the error status with respect to the MFP image.

Then, when the error status of the MFP 1 is resolved, the image information generating unit 22 of the operation apparatus 2 generates an operation image of the application that had been used when the error had occurred. Furthermore, the message setting unit 27 sets message with respect to the generated operation image. In this manner, according to the present embodiment, at the timing when the error status of the MFP 1 is resolved, it is possible to automatically generate the operation image of the application that had been used when the error had occurred, and set a message corresponding to a regular status after the error has been resolved, with respect to the MFP image. Note that the image information generating unit 22 may store, in the RAM 203, the already-generated operation image of the application that had been used when the error had occurred, and when the error status is resolved, the image information generating unit 22 may acquire the operation image from the RAM 203.

Note that in the above embodiments, a description is given of an example in which the user touches the screen; however, the operation by the user is not limited to touching. The user's operation may be tapping, flipping, swiping, pinching, multi-touching, etc., or a combination of these operations. In any case, a message can be output by voice sound in accordance with the user's operation.

According to one embodiment of the present invention, in an operation apparatus that includes a touch panel configured to display an image generated by an electronic device, a message can be read aloud when the image generated by the electronic device is touched.

The operation apparatus, the information processing system, and the operation method are not limited to the specific embodiments described in the detailed description, and variations and modifications may be made without departing from the spirit and scope of the present invention.

What is claimed is:

1. An operation apparatus for operating an electronic device, the operation apparatus comprising:
   a processor configured to:
      cause a display to display an operation screen to operate the electronic device, said operation screen including a first operation region and a second operating region, each of said first and second operation regions having a plurality of display elements that are operatable by a user;
      determine, when the user operates the operation screen, whether the user operates a display element that belongs to the first operation region or the user operates a display element that belongs to the second operating region;
      output, by voice sound, a message that is corresponding to each of the plurality of display elements of the first operation region and different from each other, when the user operates each of the plurality of display elements of the first operating region, and
      output, by voice sound, an identical message for each of the plurality of display elements of the second operation region when the user operates any of the plurality of display elements of the second operating region.

2. The operation apparatus according to claim 1, wherein the first operation region and the second operation region do not overlap each other.

3. The operation apparatus according to claim 1, wherein the second operation region is not changed when the user operates the first operating region.

4. The operation apparatus according to claim 1, wherein the processor is further configured to:
output, by voice sound, the message that is set with respect to each of the plurality of display elements of the first operation region and different from each other, when the user operates each of the plurality of display elements of the first operating region, and
output, by voice sound, the identical message that is commonly set for each of the plurality of display elements of the second operation region when the user operates any of the plurality of display elements of the second operating region.

5. The operation apparatus according to claim 1, wherein the processor is further configured to:
receive image information for displaying the operation screen from the electronic device, and
display the first operation region that is generated regardless of the received image information and the second operation region that is generated based on the received image information.

6. The operation apparatus according to claim 1, wherein the processor is further configured to:
output, by voice sound, an identical message according to a state of the electronic device when the user operates any of the plurality of display elements of the second operating region.

7. The operation apparatus according to claim 6, wherein the state of the electronic device includes a state where a specific application is activated in the electronic device and a state where an error occurs in the electronic device.

8. The operation apparatus according to claim 1, the electronic device includes an image forming apparatus, and the operation apparatus includes an operation panel that is configured to operate the image forming apparatus.

9. An information processing system including an electronic device and an operation apparatus for operating the electronic device,
wherein the operation apparatus comprising:
a processor configured to:
cause a display to display a operation screen to operate the electronic device, said operation screen including a first operation region and a second operating region, each of said first and second operating regions having a plurality of display elements that are operatable by a user,
a receiver configured to receive a first image from the electronic device;
determine whether the user operates a display element that belongs to the first operation region or the user operates a display element that belongs to the second operation region when the user operates the operation screen;
output, by voice sound, a message that is corresponding to each of the plurality of display elements of the first operation region and different from each other, when the user operates each of the plurality of display elements of the first operating region, and
output, by voice sound, an identical message for each of the plurality of display elements of the second operation region when the user operates any of the plurality of display elements of the second operating region.

10. The information processing system according to claim 9, wherein the first operation region and the second operation region do not overlap each other.

11. The information processing system according to claim 9, wherein the second operation region is not changed when the user operates the first operating region.

12. The information processing system according to claim 9, wherein the processor is further configured to:
output, by voice sound, the message that is set with respect to each of the plurality of display elements of the first operation region and different from each other, when the user operates each of the plurality of display elements of the first operating region, and
output, by voice sound, the identical message that is commonly set for each of the plurality of display elements of the second operation region when the user operates any of the plurality of display elements of the second operating region.

13. The information processing system according to claim 9, wherein the processor is further configured to:
receive image information for displaying the operation screen from the electronic device, and
display the first operation region that is generated regardless of the received image information and the second operation region that is generated based on the received image information.

14. The information processing system according to claim 9, wherein the processor is further configured to:
output, by voice sound, an identical message according to a state of the electronic device when the user operate any of the plurality of display elements of the second operating region.

15. An operation method for operating an electronic device, comprising:
causing a display to display a operation screen to operate the electronic device, said operation screen including a first operation region and a second operating region, each of said first and second operating regions having a plurality of display elements that are operatable by a user,
a receiver configured to receive a first image from the electronic device;
determining whether the user operates a display element that belongs to the first operation region or the user operates a display element that belongs to the second operation region when the user operates the operation screen;
outputting, by voice sound, a message that is corresponding to each of the plurality of display elements of the first operation region and different from each other, when the user operates each of the plurality of display elements of the first operating region, and
outputting, by voice sound, an identical message for each of the plurality of display elements of the second operation region when the user operates any of the plurality of display elements of the second operating region.

16. The operation method according to claim 15, wherein the first operation region and the second operation region do not overlap each other.

17. The operation method according to claim 15, wherein the second operation region is not changed when the user operates the first operating region.

18. The operation method according to claim 15, wherein the method further comprises:
outputting, by voice sound, the message that is set with respect to each of the plurality of display elements of the first operation region and different from each other, when the user operates each of the plurality of display elements of the first operating region, and outputting, by voice sound, the identical message that is commonly set for each of the plurality of display elements of the second operation region when the user operates any of the plurality of display elements of the second operating region.

19. The operation method according to claim 15, wherein the method further comprises:

receiving image information for displaying the operation screen from the electronic device, and displaying the first operation region that is generated regardless of the received image information and the second operation region that is generated based on the received image information.

20. The operation method according to claim 15, wherein the method further comprises:

outputting, by voice sound, an identical message according to a state of the electronic device when the user operates any of the plurality of display elements of the second operating region.

\* \* \* \* \*